(12) United States Patent
Coleman et al.

(10) Patent No.: US 7,457,802 B2
(45) Date of Patent: Nov. 25, 2008

(54) INTERNET SEARCHING ENHANCEMENT METHOD FOR DETERMINING TOPICAL RELEVANCE SCORES

(76) Inventors: Jason Coleman, 5931 Melshire Dr., Dallas, TX (US) 75230; Steven Thrasher, 391 Sandhill Dr., Dallas, TX (US) 75080

( * ) Notice: Subject to any disclaimer, the term of this patent is extended or adjusted under 35 U.S.C. 154(b) by 236 days.

(21) Appl. No.: 11/638,763

(22) Filed: Dec. 14, 2006

(65) Prior Publication Data

US 2008/0147609 A1    Jun. 19, 2008

(51) Int. Cl.
*G06F 17/00*    (2006.01)
*G06F 17/30*    (2006.01)

(52) U.S. Cl. ..................... 707/5; 707/104.1

(58) Field of Classification Search ............... None
See application file for complete search history.

(56) References Cited

U.S. PATENT DOCUMENTS

| 5,875,446 A * | 2/1999 | Brown et al. .................. 707/3 |
| 2002/0103809 A1 * | 8/2002 | Starzl et al. .................. 707/102 |
| 2003/0014399 A1 * | 1/2003 | Hansen et al. .................. 707/3 |

OTHER PUBLICATIONS

Soo Young Rieh, "Judgment of information quality and cognitive authority in the Web", Journal of the American Society for Information Science and Technology 2002, pp. 145-161.*

* cited by examiner

*Primary Examiner*—Uyen T. Le (57) ABSTRACT

The invention provides database search enhancements, including Real-Time Search Visualization, Taxonomic Modeling of the Internet, Segment Modeling of the Internet, Lexicon Modeling of Search Terms, Dynamic Advertising Property Generator, and Quintuple-Tier Relevancy (5TR).

1 Claim, 6 Drawing Sheets

Figure 1 – RTSV

Figure 2 – Taxonomic Model – Class Structure

Figure 3 – Segment Modeling of Internet Content

Figure 4 – Lexicon Search Refinement

Figure 5 – DAPG Property Generation

Figure 6 – 5TR Relevancy

INTERNET SEARCHING ENHANCEMENT METHOD FOR DETERMINING TOPICAL RELEVANCE SCORES

FIELD OF THE INVENTION

The invention is generally related to database searching, and more particularly to facilitating database searching and the display of those search results.

STATEMENT OF A PROBLEM ADDRESSED BY THE INVENTION

With the exploding volume of data in today's society, database searching and interaction is tedious and usually seems far less productive then the time spent searching would indicate. Additionally, to optimally search a database, one may need professional training and/or support. The present invention overcomes these disadvantages.

EXEMPLARY EMBODIMENT OF A BEST MODE

Interpretation Considerations

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for -functioning-" or "step for -functioning-" in the Claims section. Sixth, the invention is also described in view of the Festo decisions, and, in that regard, the claims and the invention incorporate equivalents known, unknown, foreseeable, and unforeseeable. Seventh, the language and each word used in the invention should be given the ordinary interpretation of the language and the word, unless indicated otherwise.

Some methods of the invention may be practiced by placing the invention on a computer-readable medium and/or in a data storage ("data store") either locally or on a remote computing platform, such as an application service provider, for example. Computer-readable mediums include passive data storage, such as a random access memory (RAM) as well as semi-permanent data storage such as a compact disk read only memory (CD-ROM). In addition, the invention may be embodied in the RAM of a computer and effectively transform a standard computer into a new specific computing machine.

Data elements are organizations of data. One data element could be a simple electric signal placed on a data cable. One common and more sophisticated data element is called a packet. Other data elements could include packets with additional headers/footers/flags. Data signals comprise data, and are carried across transmission mediums and store and transport various data structures, and, thus, may be used to transport the invention. It should be noted in the following discussion that acts with like names are performed in like manners, unless otherwise stated.

Of course, the foregoing discussions and definitions are provided for clarification purposes and are not limiting. Words and phrases are to be given their ordinary plain meaning unless indicated otherwise. Further, although the following discussion is directed at internet data searching, it is appreciated that the teachings of the exemplary embodiment are equally applicable to databases and other data collections in general.

DESCRIPTION OF THE DRAWINGS

Real-Time Search Visualization

Figure 1:
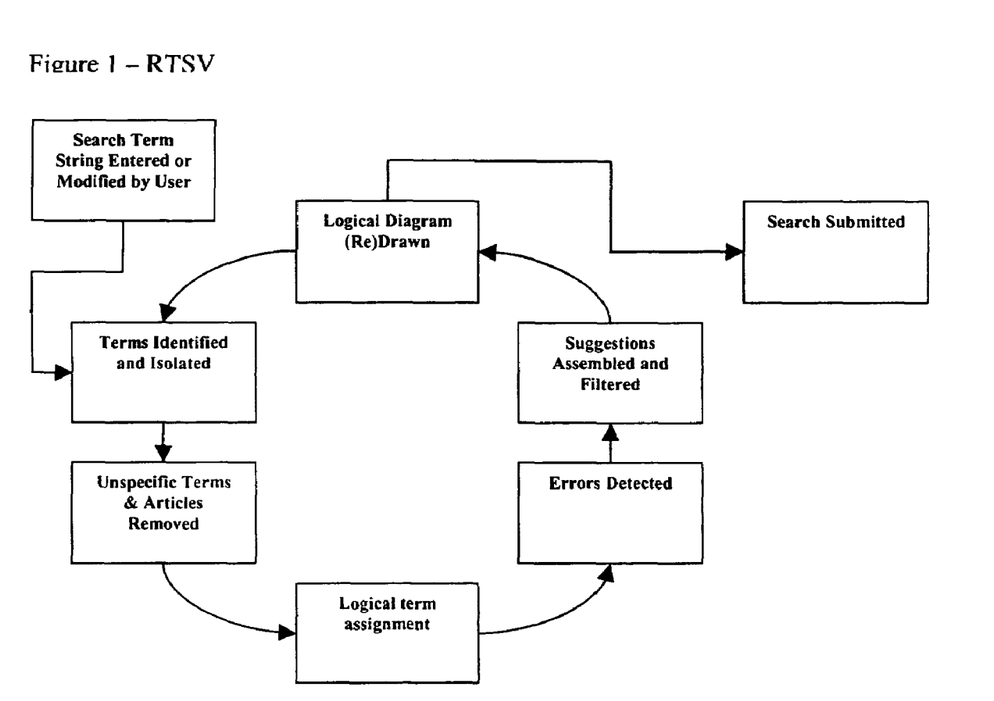
FIG. 1 supports the description of Real-Time Search Visualization.

With Reference to FIG. 1, the invention comprises the means by which a person searching for information in the internet can obtain real-time feedback to the logic, terms and nature of the search they are constructing with a search engine. The feedback provided can be by any means provided for by the computer interface, including text, graphics, animation, video, audio, etc.

RTSV is a means by which a search engine user interface can be enhanced. The primary use of RTSV is to build a logical diagram of the search being created by the user as terms are entered in to the engine. The logical diagram will provide a logical set illustration of the following:

The terms being searched for
The logical relationship of the terms
Possible flaws in the search
Possible means to enhance the search RTSV provides a base logical descriptor language that makes the search translatable into a number of types of visual diagrams including 2 dimensional, 3 dimensional, set theory, logical diagrams, etc.

RTSV provides the user the ability to recognize problems with the search, both logical and spelling earlier than traditional methods. (before the search is submitted to the search engine)

RTSV provides the user the ability to refine the search by interacting directly with the diagram using a pointing device.

RTSV provides the ability to prompt the user with suggestions to make the search better prior to submittal to the search engine.

RTSV enables the user to recognize any articles or other forms of speech that are algorithmically removed from the search by default and, if desired, modify the search to include them prior to submittal to the search engine.

Taxonomic Modeling of the Internet

Figure 2:
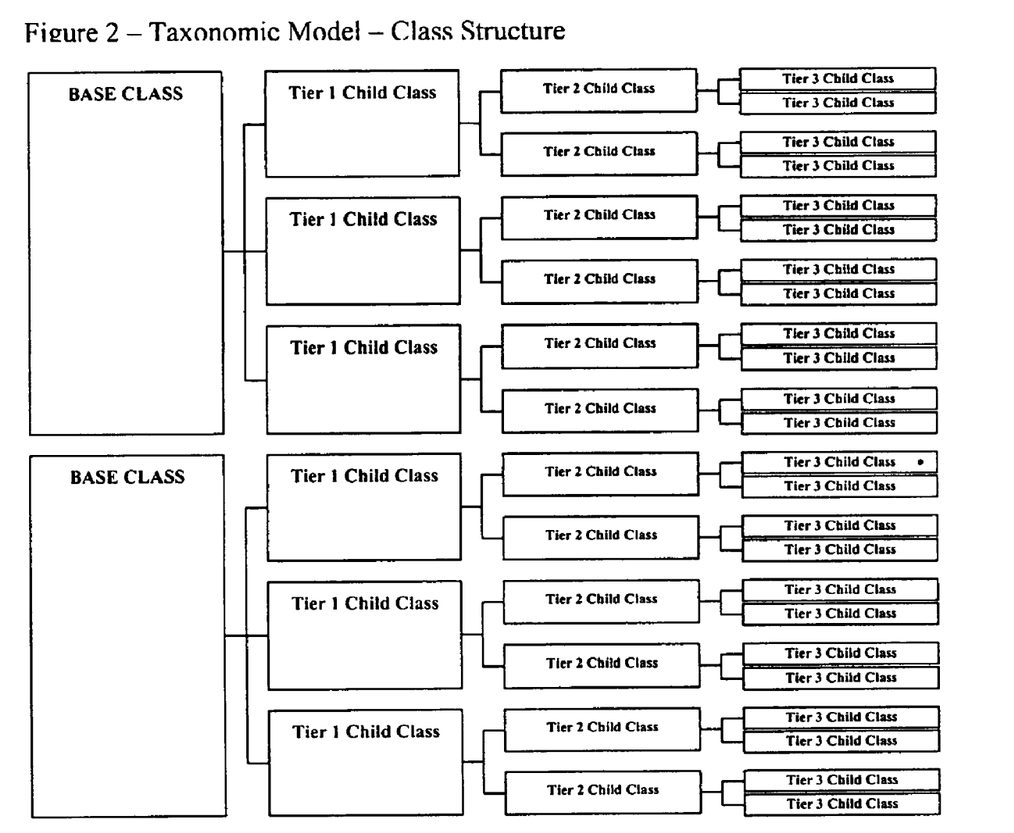
FIG. 2 supports the description of Taxonomic Modeling of the Internet.

With reference to FIG. 2, The Taxonomic Model of the Internet is a classification system for content and/or information. Any content and/or information accessible via the Internet or any other distributed content storage system can be addressed by the Taxonomic Model. It is comprised of several major classes of content, each of which may be subdivided into continually smaller and more focused subclasses.

The Segment Model is specifically intended to be used as part of a Search System for digital content.

In common practice, no major method for systematic classification of Internet content is used. Current methods for search facilitation utilize algorithmic analysis of content, meta-content, context and links to derive associations with keywords or key phrases (and thus topical) relevance of any content. This results in topical errors because it relies on the occurrence of individual words or phrases to determine topical relevance.

The Taxonomic Model differs substantially from current methods in that it assumes that all or most content can be assigned to a content class. Assignment to content class greatly enhances the ability of search systems to locate content that is relevant to any search.

The Taxonomic Model provides several advantages over traditional search systems, including:

The ability to more quickly locate content. By isolating information and content by class, specific searches for specific kinds of content provide fewer results (meaning less work is required for the user). This means that users will spend less time locating relevant results.

The ability to more accurately locate content. In any traditional search, algorithmic results can only provide word-based or phrase-based relevance. Only class based models such as the Taxonomic Model can provide conceptual-based relevance.

The ability to isolate classes or subclasses to make more relevant vertical searches (Vertical searches are those that search a particular subset of knowledge (e.g. medical conditions))

The ability to build vertical searches on-demand. (Currently all commercial vertical search engines utilize a pre-built search system that relies upon pre-configured data to locate the desired content.

The Taxonomic Model is comprised of a set of base classes which are in turn divided into progressively smaller and more focused subclasses. In any given version of the model the base classes are defined and several layers of subclasses can be defined. There is not theoretical limit to the number of tiers of subclasses, though there is a practical limit.

The class structure is heterogeneous. Meaning that no given class or subclass must have the same number of children or tiers.

Subclasses contained by one class are exclusive of subclasses contained by another class. In other words, no class will contain exactly the same subclasses.

Subclasses are unique, meaning that no subclass should exist in more than one place in the taxonomy.

Segment Modeling of the Internet

Figure 3:
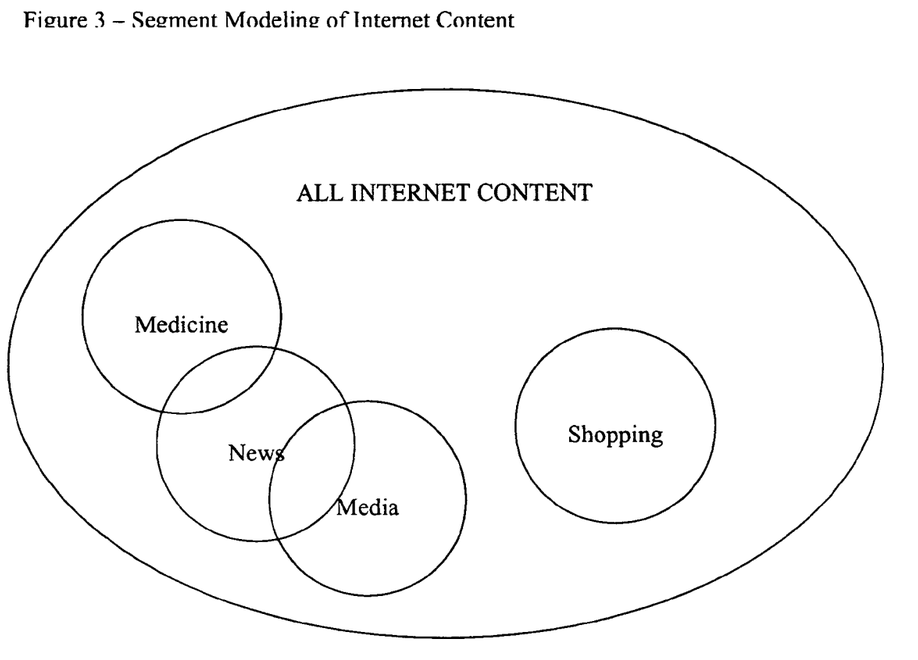
FIG. 3 supports the description of Segment Modeling of the Internet.

Referring to FIG. 3, the Segment Model is a content classification system for content and/or information. Any content and/or information accessible via the Internet or any other distributed content storage system can be addressed by the Segment Model. It is comprised of a system of user modes that content types are assigned to.

The Segment Model is specifically intended to be used as part of a Search System for digital content.

Internet users typically browse the web with a specific type of task in mind. Examples of such tasks include shopping, looking up reference information, conducting a specific type of vertical search (singles, medical information, automobile information), looking for specific media for download (music, movies), looking for specific media types (entertainment, news, stock information).

The Segment Model classifies content by the desired activity mode (or "Segment"). Each segment comprises a unique set of modes; meaning methods, interests and manners of interacting with content.

For example, a "Shopping" segment may comprise the following modes:

A desire to locate and browse commercial store catalogs
A desire to locate and browse commercial online stores
A desire to purchase items or services
A desire to avoid sites or content that may compromise any aspect of privacy or identity security
A desire to utilize commercial consumer financial services
A desire to avoid referential, news, entertainment, media or other specific segments
A desire to interpret terms in a manner that is useful to "shopping" (For example "Blue" used a descriptor of inventory selection is a preferable interpretation)
A desire to avoid the interpretation of terms in a manner that is not useful for "shopping" (For example "shipping" as an industry category is not as valuable of an interpretation of "shipping" as a cost of purchase.)

Segment Modeling enables search systems to utilize modes as a means of identifying the most relevant content to serve the user.

Modes may not be exclusive to any given Segment. In other words, different segments may contain the same or similar modes.

Modes are not unique, meaning that it is possible that one mode may be identical or very similar to another. (Although most modes will be substantially dissimilar.)

Lexicon Modeling of Search Terms

Figure 4:
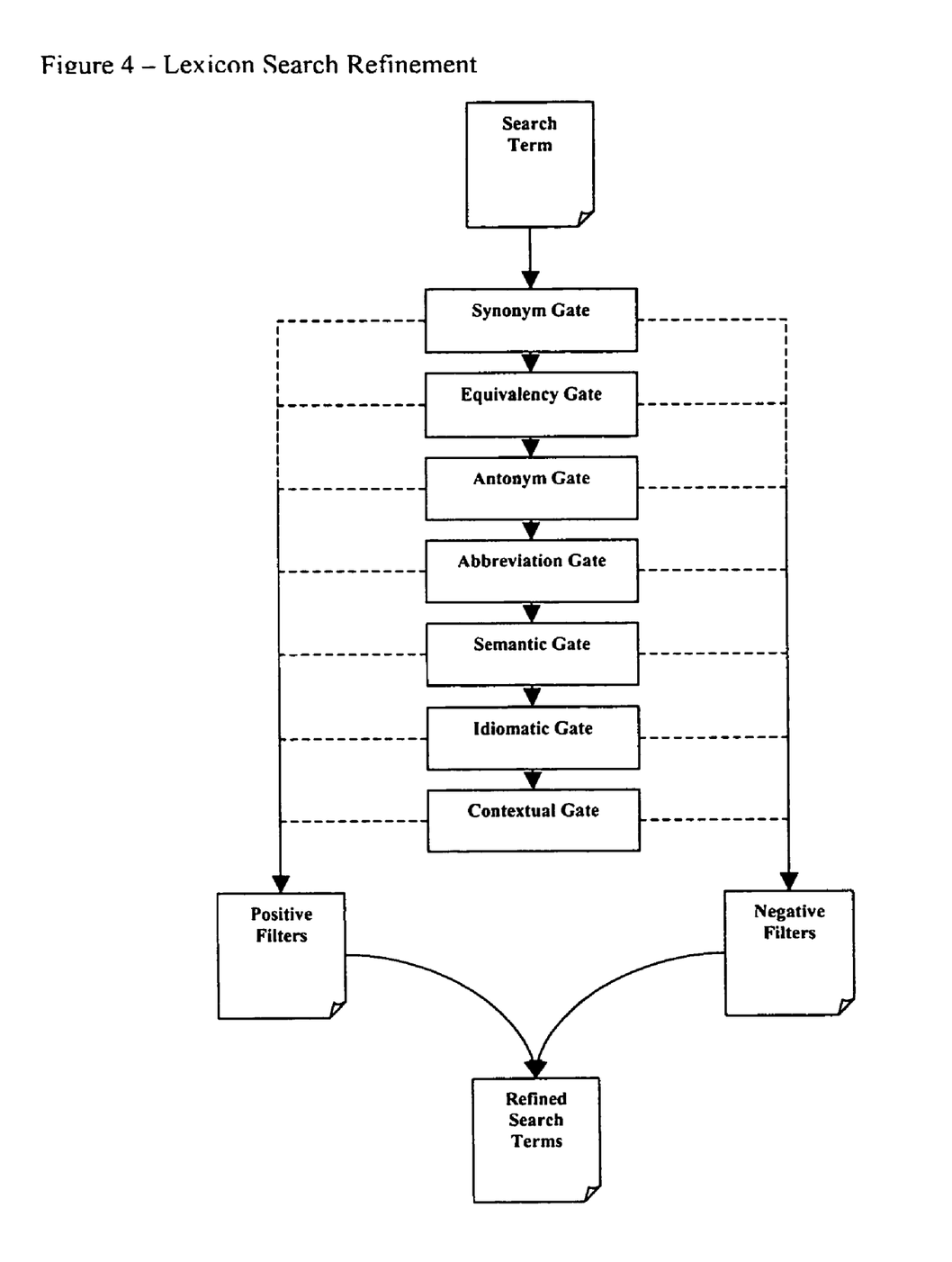
FIG. 4 supports the description of Lexicon Modeling of Search Terms.

With reference to FIG. 4, the Lexicon Model is a system that can be utilized to make searching for content and/or information on the Internet or any other distributed content storage system more efficient. The Lexicon is comprised of a data dictionary that provides definitions, equivalencies, synonyms, antonyms, slang, abbreviations and other means by which a given word or term may be identified.

The Lexicon Model is specifically intended to be used as part of a Search System for digital content.

Traditional search methods focus on specific key words or key terms literally as entered by the user of the system. They provide little or no expansion or referent for variations of a given term or phrase other than guesses at misspellings.

The Lexicon Model provides a method by which a given term or phrase is identified with a number of positive and negative filter terms or phrases that will enhance the results of the search.

For example, if a user enters "talkative" as a term the system may create positive filters for terms such as "chatty" "loquacious" and "glib" and negative filters for "reticent" and "quiet".

As another example, if a user enters "USA" as a term the system may create positive filters for "U.S.A." "United States of America" "US" and "United States".

Synonym inclusion: The system provides a means by which synonyms can be used as a filter.

Equivalency inclusion: The system provides a means by which equivalent terms that are not necessarily synonyms can be used as a filter.

Antonym exclusion: The system provides a means by which synonyms can be used as a negative filter.

Abbreviation inclusion: The system provides a means by which abbreviations can be used as a filter as well as provides reverse abbreviation translation. (i.e. providing "United Kingdom" as a filter for "UK"

Semantic: The system provides the means to extract word similarities broader than synonyms. (For example "thread" could generate "meander" "ribbon" "spool" "thinking" "line of thought" "travel")

Idiomatic expressions: The system provides the means to generate filters based on idiomatic expressions. (For example "About Face" could generate filters of "turnaround" "reversal" "u-turn" "sea change" "Change of heart")

Contextual Leaping: The system provides the means to make logical leaps based upon the totality of terms submitted. (For example "sale for red" would filter "for sale" and "red" as two separate terms.)

The Lexicon takes terms that are produced as positive and negative filters for a given search and enables their inclusion in the search and search results automatically, or at the user's discretion.

Dynamic Advertising Property Generator

Figure 5:
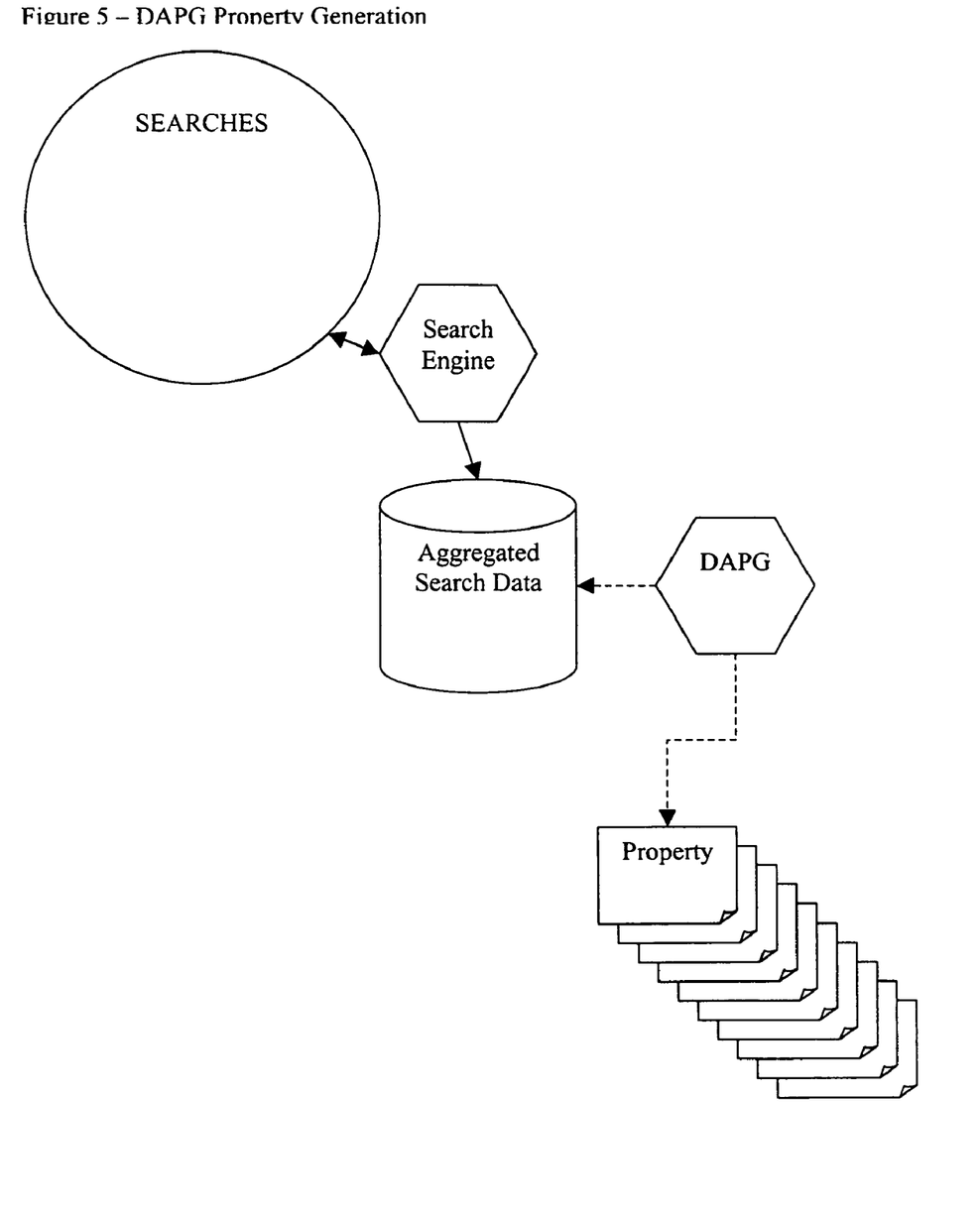
FIG. 5 supports the description of Dynamic Advertising Property Generator.

With reference to FIG. 5, the Dynamic Advertising Property Generator is a system that supports and enhances an online advertising system. The DAPG is an automated system that creates and records advertising properties for the Internet.

The DAPG mines information on how users of a search engine search and what they search for. It uses this information to automatically generate "properties" for online advertising.

Online advertising is currently sold based on words. A given word or phrase association is purchased for a given number of impressions, click-thrus, period of time or combination thereof.

The DAPG provides a more complex definition of what is being bought and sold. It provides a more robust means of defining the space in which an online ad will be seen or interacted with and a more accurate way of predicting the audience that will encounter the ad.

The space of a property is comprised of one or more terms, one or more geographic regions, one or more segments, one or more taxonomic classification and a period of time. The demand for a property is measured by the number of searches that enter its space within a period of time.

THE DAPG uses configuration data and the demand of existing properties to determine a number of things:
  Whether or not a given property is viable for commercial advertising sales
  The rate that should be charged for a given property
  The unit if time that should be used to measure the rate for a given property
  Related properties
  The number of impressions that should be used to make a unit rate for a given property
  The number of click-thrus that should be used to make a unit rate for a given property Property is a concept that is unique to the DAPG model of online advertising.

Properties can be generated automatically by the system and can also be generated by user request. When a property is generated by user request the system generates pricing information on demand.

Quintuple-Tier Relevancy (5TR)

Figures 5, 6:
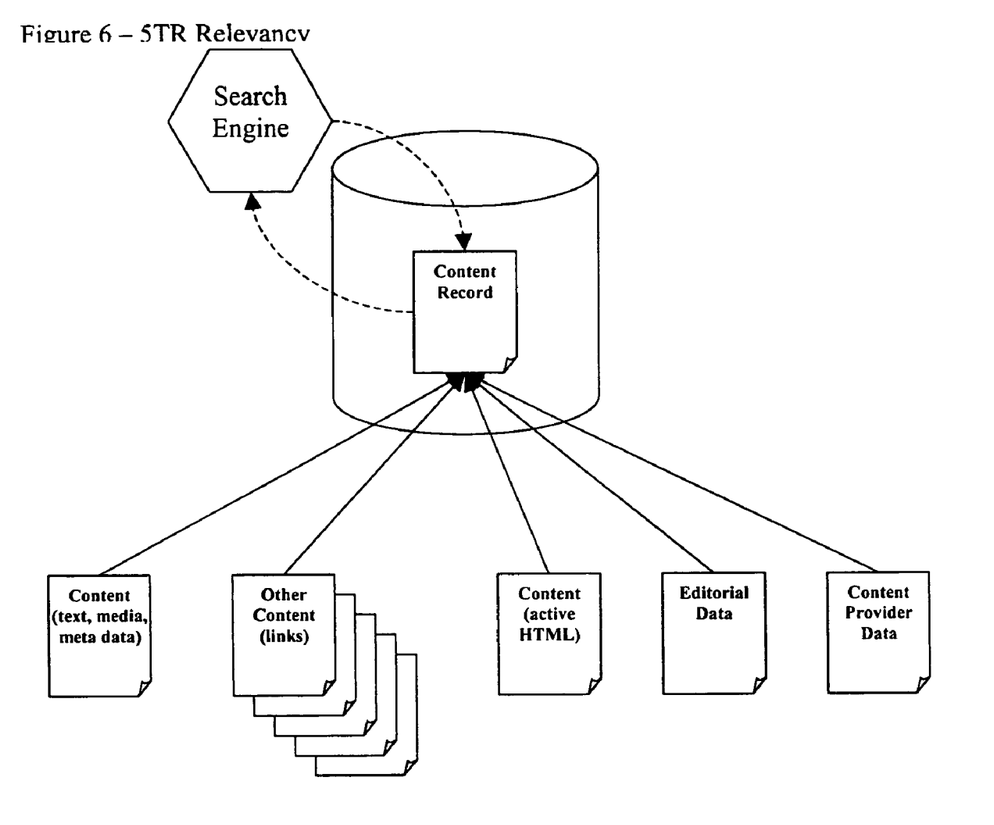
FIG. 6 supports the description of Quintuple-Tier Relevancy (5TR).

With reference to FIG. 6:

Quintuple-Tier Relevancy (or 5TR) is a model of content relevancy that is used to enhance the search capabilities and results quality of an Internet search engine.

5TR provides a means by which a search engine can provide superior results over traditional methods.

Traditional methods for search facilitation utilize algorithmic analysis of content, meta-content, context and links to derive associations with keywords or keyphrases (and thus topical) relevance of any content. These methods are all double-tier in that they rely on only two sources of information to determine topical relevance: The content itself and links to that content.

Additionally, traditional sources if information on content are highly susceptible to manipulation by the content provider and third parties who may have benign or malignant effects on the value of the resulting search data.

5TR increases the reliability and value of search result data by using more data sources to determine relevancy and using sources that have lower susceptibility to manipulation.

5TR utilizes five sources of information to determine topical relevance:
  1. Content
  2. Links to Content
  3. Editorial Description
  4. Content Provider Description
  5. Active HTML Content: This includes the actual text and media files contained in the content itself plus any generic meta tags that are present in the content. A number of assumptions can be made about the content based on content data, including, region, adult rating, taxonomy, segment, etc.—but most importantly, keyword relevance. Content data is highly susceptible to manipulation and or errors that may make the content very difficult or impossible to locate with a traditional search engine.

Links to Content: This includes all known links to the content from other sources, usually confined to those on other domains. A number of assumptions can be made about the content based on link data, including, region, adult rating, taxonomy class, segment, etc.—but most importantly, keyword relevance. Links to content are entirely out of the control of the search engine provider and the content provider and are thus susceptible to third-party manipulation.

Editorial Description: This is a unique source of information to 5TR. This comprises an editorial data file that is kept on record for a given piece of content or domain. The editorial file contains a hard record of a number of factors about the content, including, region, adult rating, taxonomy class, segment, etc. The editorial file is created and maintained solely by the search engine provider and thus is immune to tampering by the content provider or any third party.

Content Provider Description: This is a unique source of information to 5TR. This comprises a data file that may be submitted by the content provider for a domain or narrower portion of content. It allows the content provider to associate the content with a specific region, taxonomy class, segment, etc. This data file is created and maintained by the content provider only and is thus the best record of the intent of the provider. Content ownership is confirmed through a body such as ICANN. The susceptibility of this data to manipulation is very, very low.

Active HTML: This is a unique source of information to 5TR. This comprises a proprietary meta tag language with proprietary usage rules. This allows content providers to hard-code associations with regions, taxonomy classes, segments, etc. This enables the content provider to give granular information about content to the search engine provider through the automated crawling of the site. The susceptibility of this data to manipulation is low, but is always isolated to the single document in question.

Though the invention has been described with respect to a specific preferred embodiment, many variations and modifications (including equivalents) will become apparent to those skilled in the art upon reading the present application. It is therefore the intention that the appended claims and their equivalents be interpreted as broadly as possible in view of the prior art to include all such variations and modifications.

We claim:

1. A method of enhancing internet searching by using at least five sources of information to determine a topical relevance, the method comprising:

automatically using content of a first internet page to compute a content topical relevance score;

automatically using links to the first internet page content to compute a link topical relevance score;

automatically using an editorial description to compute an editorial description topical relevance score;

automatically using a content provider description to compute a content provider description topical relevance score;

automatically using active HTML to compute an active HTML topical relevance score; and automatically using the relevance scores to compute a total relevance score.

* * * * *

US 007457802 C1

(12) INTER PARTES REEXAMINATION CERTIFICATE (557th)

United States Patent
Coleman et al.

(10) Number: US 7,457,802 C1
(45) Certificate Issued: Mar. 18, 2013

(54) INTERNET SEARCHING ENHANCEMENT METHOD FOR DETERMINING TOPICAL RELEVANCE SCORES

(76) Inventors: Jason Coleman, Dallas, TX (US); Steven Thrasher, Dallas, TX (US)

Reexamination Request:
No. 95/001,233, Sep. 17, 2009

Reexamination Certificate for:
Patent No.: 7,457,802
Issued: Nov. 25, 2008
Appl. No.: 11/638,763
Filed: Dec. 14, 2006

(51) Int. Cl.
*G06F 17/00* (2006.01)
*G06F 17/30* (2006.01)
(52) U.S. Cl. ... 707/999.005; 707/999.104; 707/E17.091

(58) Field of Classification Search ........................ 707/5
See application file for complete search history.

(56) References Cited

To view the complete listing of prior art documents cited during the proceeding for Reexamination Control Number 95/001,233, please refer to the USPTO's public Patent Application Information Retrieval (PAIR) system under the Display References tab.

*Primary Examiner* — Zoila Cabrera (57) ABSTRACT

The invention provides database search enhancements, including Real-Time Search Visualization, Taxonomic Modeling of the Internet, Segment Modeling of the Internet, Lexicon Modeling of Search Terms, Dynamic Advertising Property Generator, and Quintuple-Tier Relevancy (5TR).

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claim 1 is confirmed.

\* \* \* \* \*